United States Patent [19]
Leger et al.

[11] Patent Number: 5,838,661
[45] Date of Patent: Nov. 17, 1998

[54] METHOD AND ARRANGEMENT FOR SHUTTING OFF A RECEIVE CHANNEL IN A DATA COMMUNICATIONS SYSTEM

[75] Inventors: Geary Leger, Fremont; Bhoopal R. Benjaram, Sunnyvale; Peter R. Carpenter, Watsonville, all of Calif.

[73] Assignee: Cirrus Logic, Inc., Fremont, Calif.

[21] Appl. No.: 623,260

[22] Filed: Mar. 27, 1996

[51] Int. Cl.⁶ .................................. H04J 1/16; H04J 3/14
[52] U.S. Cl. ............................................. 370/229; 370/232
[58] Field of Search ..................................... 370/229, 230, 370/231, 232, 235, 236, 252, 253

[56] References Cited

U.S. PATENT DOCUMENTS

| | | | |
|---|---|---|---|
| 5,193,151 | 3/1993 | Jain | 370/830 |
| 5,394,396 | 2/1995 | Yoshimura et al. | 370/236 |
| 5,487,061 | 1/1996 | Bray | 370/252 |
| 5,659,758 | 8/1997 | Gentry et al. | 370/229 |
| 5,663,948 | 9/1997 | Kobunaya | 370/229 |

*Primary Examiner*—Ajit Patel
*Attorney, Agent, or Firm*—Lowe, Price, LeBlanc & Becker; Frank D. Nguyen

[57] ABSTRACT

A method and arrangement for shutting off a receive channel in a data communications system to prevent accidental or intentional overwhelming of the memory of the system such as that caused by a continuous burst of short frame data. The data frames received are monitored by a shutoff counter as they are received on one of the channels of a serial input/output (I/O) device. When the shutoff count is reached, the receive channel will be shut off. The current value of the shutoff counter is compared to a value stored in a warning register. Before reaching the shutoff count, a warning is generated when the current shutoff counter value reaches the warning register value.

14 Claims, 4 Drawing Sheets

METHOD AND ARRANGEMENT FOR SHUTTING OFF A RECEIVE CHANNEL IN A DATA COMMUNICATIONS SYSTEM

FIELD OF THE INVENTION

The present invention relates to the field of data communications, and more particularly, to shutting off a receive channel of a processing system.

BACKGROUND OF THE INVENTION

Modern data communication systems allow geographically remote data terminals to connect via a network to a central system via a remote access router. For example, a telecommuter may connect his home personal computer via a data communication network to a central computer at the main office worksite. The connection is typically made from a network through a modem bank to a serial input/output (I/O) device to the host system (i.e.,the central computer). The serial I/O device may have a number of separate channels for receiving and transmitting data from and to different terminals on the network.

In such arrangements, information is conventionally sent in "frames" each containing a certain amount of data. The host system buffers (temporarily stores) these frames of data as they are received, until the host system can further process the received buffer data. Any data communication system has an inherent speed bottleneck when a relatively long string of short frames are received in a burst. This creates an overall bandwidth and memory demand on the channel that received the burst of short frames. If one buffer is used per frame, then whole buffers are used to hold a small amount of received data. These buffers get used quickly. This condition is exacerbated with multiple channels especially when the channels share buffers from a common pool. If several channels have bursts of short frames at the same time, then this bandwidth demand is even greater, and chances of lost frames increase.

The receipt of a single small (or short) frame of data does not normally pose a difficulty for the host system. However, receiving a continuous burst of short frame data can easily overwhelm the memory of a system as it tries to process the short frames. Unfortunately, the sending of short frames of data in a continuous burst from a terminal over a network to a remote access router may be done deliberately in an attempt to break the remote access router. This vandalism is possible by any person able to send data to the remote access router on one of the receive channels. With the ever growing number of remote terminals, the risk of vandalism of a remote access router is high. In addition to deliberate acts, short frames of data can also be sent by accident, such as by a malfunctioning computer or router, or if a computer is programmed to send an entire packet around a carriage return and a user's elbow rests on the "enter" key.

SUMMARY OF THE INVENTION

There is therefore a need for preventing accidental or intentional overwhelming the resources of a host or remote access device such as that caused by a continuous burst of short frame data.

This and other needs are met by the present invention which provides a method of controlling a receive channel in a data communications system that receives data frames, comprising the steps of setting a shutoff counter with an initial count; changing the count in the shutoff counter upon the receipt of each data frame to determine a current shutoff count; shutting off the receive channel when the shutoff counter reaches a predetermined count; setting a warning storage element with a warning value; comparing said current shutoff count with the warning value; and generating an indication of an approaching shutoff when the shutoff count reaches the warning value.

Another aspect of the present invention provides a shutoff valve device coupled to a host central processing unit (CPU) and at least one receive channel for receiving data frames. The shutoff valve controls data transfer and comprises: a shutoff counter coupled to the host CPU that changes count upon receipt of a data frame by the serial I/O device over the receive channel; the host CPU initially sets the shutoff counter to an initial count, the shutoff counter changing its count with the receipt of each data frame over the receive channel, the shutoff counter generating a signal shutting off the receive channel from receiving further data frames after the shutoff counter reaches a predetermined count; a warning storage element coupled to the host CPU, the controller initially loading the warning storage element with a warning value; and a comparator coupled to the shutoff counter and the warning storage element, the comparator generating an indicating signal of an approaching shutoff when the shutoff counter reaches the warning value.

Still another aspect of the present invention provides a remote access device that includes a bus; a host central processing unit (CPU) coupled to the bus; a memory coupled to the bus; and a serial I/O device coupled to the bus. The serial I/O device having at least one receive channel for receiving data frames and a shutoff valve comprising: a shutoff counter coupled to the host CPU that changes count upon receipt of a data frame by the serial I/O device over the receive channel; the host CPU initially sets the shutoff counter to an initial count, the shutoff counter changing its count with the receipt of each data frame over the receive channel, the shutoff counter generating a signal shutting off the receive channel from receiving further data frames after the shutoff counter reaches a predetermined count; a warning storage element coupled to the host CPU, the controller initially loading the warning storage element with a warning value; and a comparator coupled to the shutoff counter and the warning storage element, the comparator generating an indicating signal of an approaching shutoff when the shutoff counter reaches the warning value.

A still further aspect of the present invention provides a remote access router comprising a bus, a central processing unit (CPU) coupled to the bus, a memory coupled to the bus, and a serial I/O device coupled to the bus. The serial I/O device includes at least one receive channel for receiving data frames, a shutoff counter that changes count upon receipt of a data frame by the serial I/O device over the receive channel, and a serial I/O controller that initially sets the shutoff counter to an initial count. The shutoff counter changes its count with the receipt of each data frame over the receive channel. The serial I/O controller shuts off the receive channel from receiving further data frames after the shutoff counter reaches a specified count.

The foregoing and other features, aspects and advantages of the present invention will become more apparent from the following detailed description of the present invention when taken in conjunction with the accompanying drawings.

DESCRIPTION OF THE PREFERRED EMBODIMENTS

Figure 1:
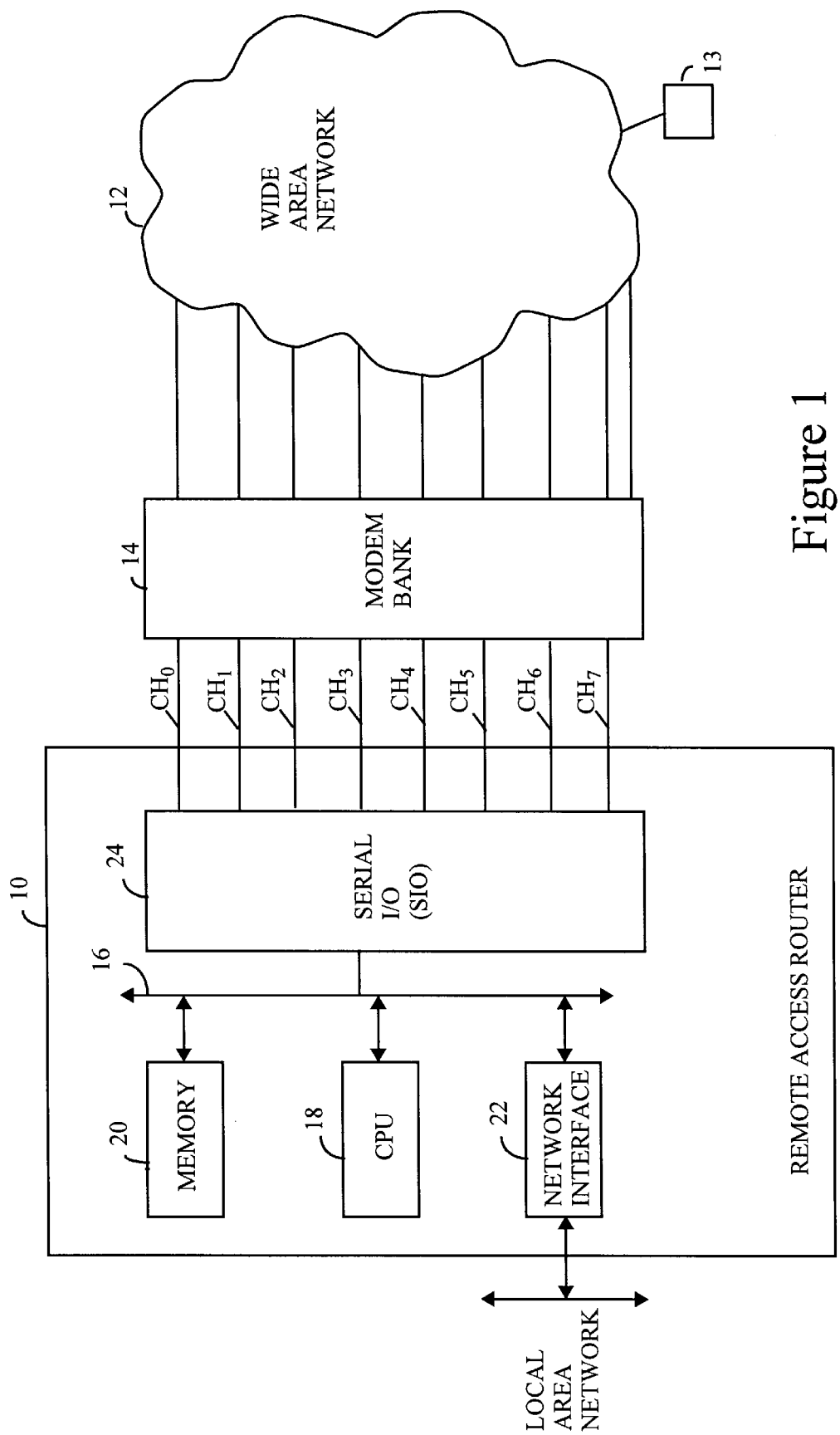
FIG. 1 is a block diagram of an arrangement of a remote access router constructed in accordance with an embodiment of the present invention connected to a network via a modem bank.

FIG. 1 is a block diagram of an arrangement in which terminals 13 on a network 12 may connect to a remote access router 10. The network may be a geographically large network, separated by a large distance from the remote access router 10. The network 12 may be any type of data network, such as a wide area network. A terminal 13 (of which only one is shown in FIG. 1) on the network 12 may be a personal computer (PC), a laptop computer, or other type of data processing device.

A modem bank 14 connects the network 12 to a remote access router 10 at a central location, for example, such as at an office. The modem bank 14 communicates data between the remote access router 10 and the network 12 over a plurality of channels $CH_N$. In the exemplary embodiment of FIG. 1, there are eight channels $CH_0$–$CH_7$ over which data can be received by the remote access router 10, and also over which data can be transmitted to the network 12. Although illustrated separately from the remote access router 10, in certain embodiments the modem bank 14 is part of the remote access router 10.

A serial input/output (I/O) device 24 acts as an interface between the host system, represented by the remote access router 10, and the modem bank 14 along with the network 12. The serial I/O device 24 has eight separate channels $CH_0$–$CH_7$ over which data can be transmitted and received. The serial I/O device 24 works with memory 20 of the remote access router 10 in performing buffer management during transmission and receipt of data.

The remote access router 10 has a central processing unit (CPU) coupled to the serial I/O device 24 by a bus 16. The bus 16 may be a peripheral component interface (PCI) bus, for example. Also connected on the bus 16 are a memory 20 and network interface 22. Network interface 22 connects a local area network 11 to the bus 16.

In normal operation, such as receiving data from the remote terminal 13 for instance, data is transmitted in frames by the terminal 13 over the network 12. The modem bank 14 receives the data over one of its lines and forwards the data to the remote access router 10 over one of the channels $CH_0$–$CH_7$. The serial I/O device 24 receives the data and assembles the received data into frames and places the receive data into memory 20 by direct memory access. Serial I/O device 24 may interrupt the CPU 18. The CPU 18 is then able to make use of the data in the memory 20 which has been received from the remote terminal 13, moving it to network interface 22, for example.

Whether accidental or intentional, a remote terminal 13 or other equipments like routers inside the wide area network may send data as a continuous burst of short frames. The receipt of a continuous burst of short frames, however, may easily overwhelm the memory 20 of the remote access router 10, as the continuous demand for more memory buffers for each of the short frames consumes an excessive amount of processor overhead with little data to report.

In order to overcome this problem, the present invention provides a method and arrangement that shuts off a channel.

Figure 2:
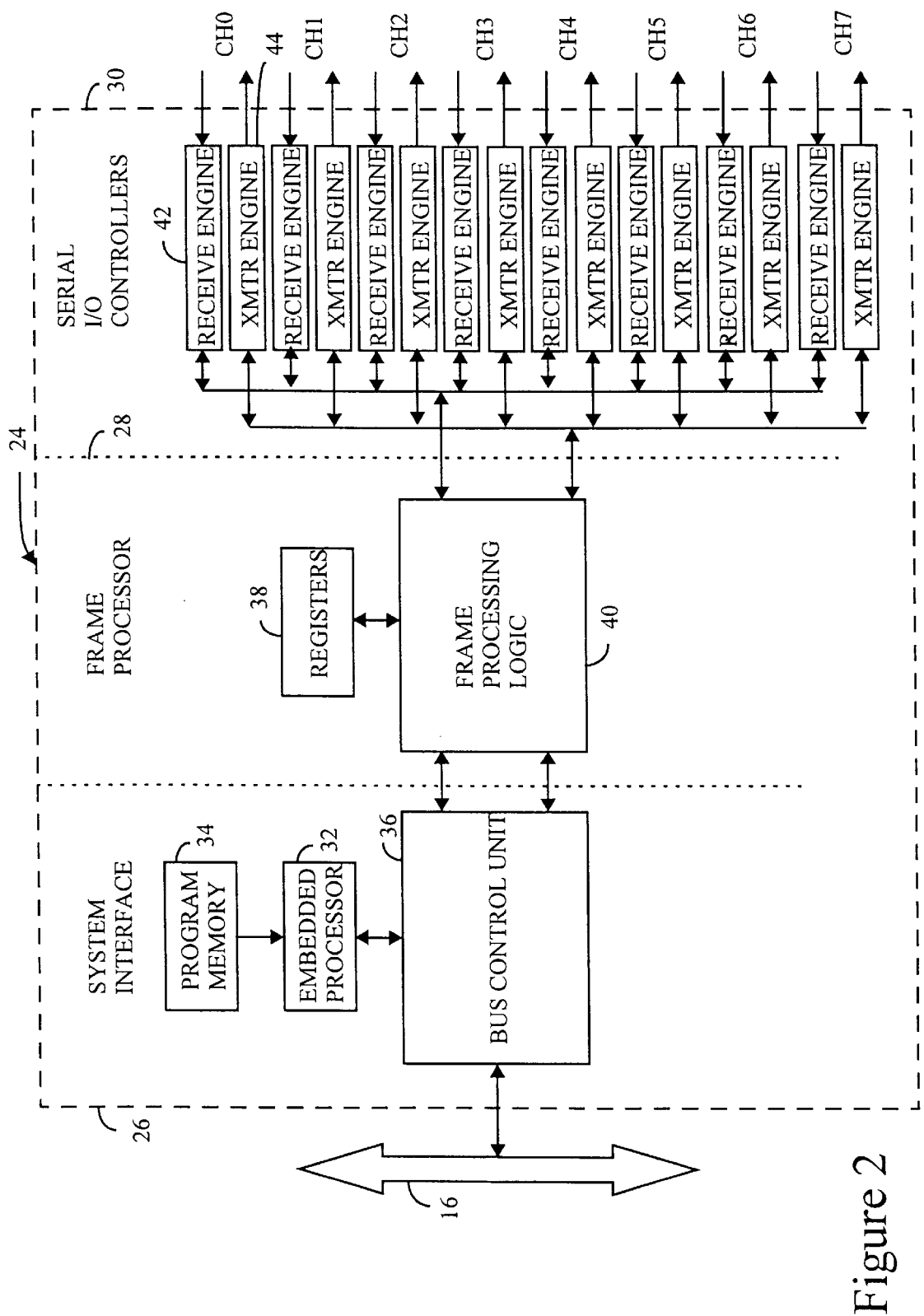
FIG. 2 is a block diagram of a serial I/O device constructed in accordance with an embodiment of the present invention.

According to certain embodiments, an opportunity is provided to shut off the channel and minimize lost data. A block diagram of a serial I/O device 24, which may contain embodiments of the present invention and which can be used in the arrangement of FIG. 1, is depicted in FIG. 2.

The serial I/O device 24 can be logically divided into three sections; a system interface 26, a frame processor 28, and a serial I/O controller section 30. The system interface 26 interfaces the serial I/O device 24 to the rest of the remote access router 10, over the bus 16. For this purpose a bus control unit 36 is coupled to the bus 16, and acts as a bus master processor. The bus control unit 36 performs FIFO management, data path control, and also serves as an interrupt controller.

An embedded processor 32 is a processor that performs the control function within the serial I/O device 24. The embedded processor 32 may be part of the exemplary embodiment and is not required for the invention. The embedded processor 32 is implemented in certain embodiments as an advanced reduced instruction set computer (RISC) machine that controls the counters and functions on the chip. Programming for the serial I/O device 24 may be stored in an on-chip memory, such as a programmable read-only memory (PROM) 34.

The frame processor section 28 of the serial I/O device 24 has a plurality of registers 38 that contain global registers that pertain to the serial I/O device 24 in general, and channel registers that pertain to the specific channels. These registers 38 contain the shutoff counter and the warning level register that are part of the shutoff valve which will be discussed later. Frame processing logic 40 performs frame assembly, provides control of individual channels, channel status information, and performs timing on the individual channels. The frame processing logic 40 also has a plurality of FIFO's to temporarily buffer and frame the data as it is received or transmitted. Finally, the frame processing logic 40 contains the comparator logic that is part of the shutoff valve which will be discussed later.

The serial I/O controller section 30 contains, in the exemplary embodiment, eight receive engines 42 and eight transmitter engines 44, which provide the communication between the modem bank 14 and the frame processing logic 40. The receive engines 42 and the transmitter engines 44 perform bit rate selection and cyclic redundancy check (CRC) computations.

Depending on the application, some receive channels may be vulnerable to a "run-away" condition. This condition occurs when the remote transmitting station sends very large amounts of short frame data, overflowing the receive channel. Since all of the receive channels on the serial I/O device may share a common receive descriptor queue and a common receive status queue such as those described in Patent Application "A Method and Arrangement for Performing Multi-Chip and Multi-Channel Direct Memory Access" having a filing date of Sep. 29, 1995 and Ser. No. 08/536,729, such an overflow could temporarily lock-up all receive channels.

Figure 3:
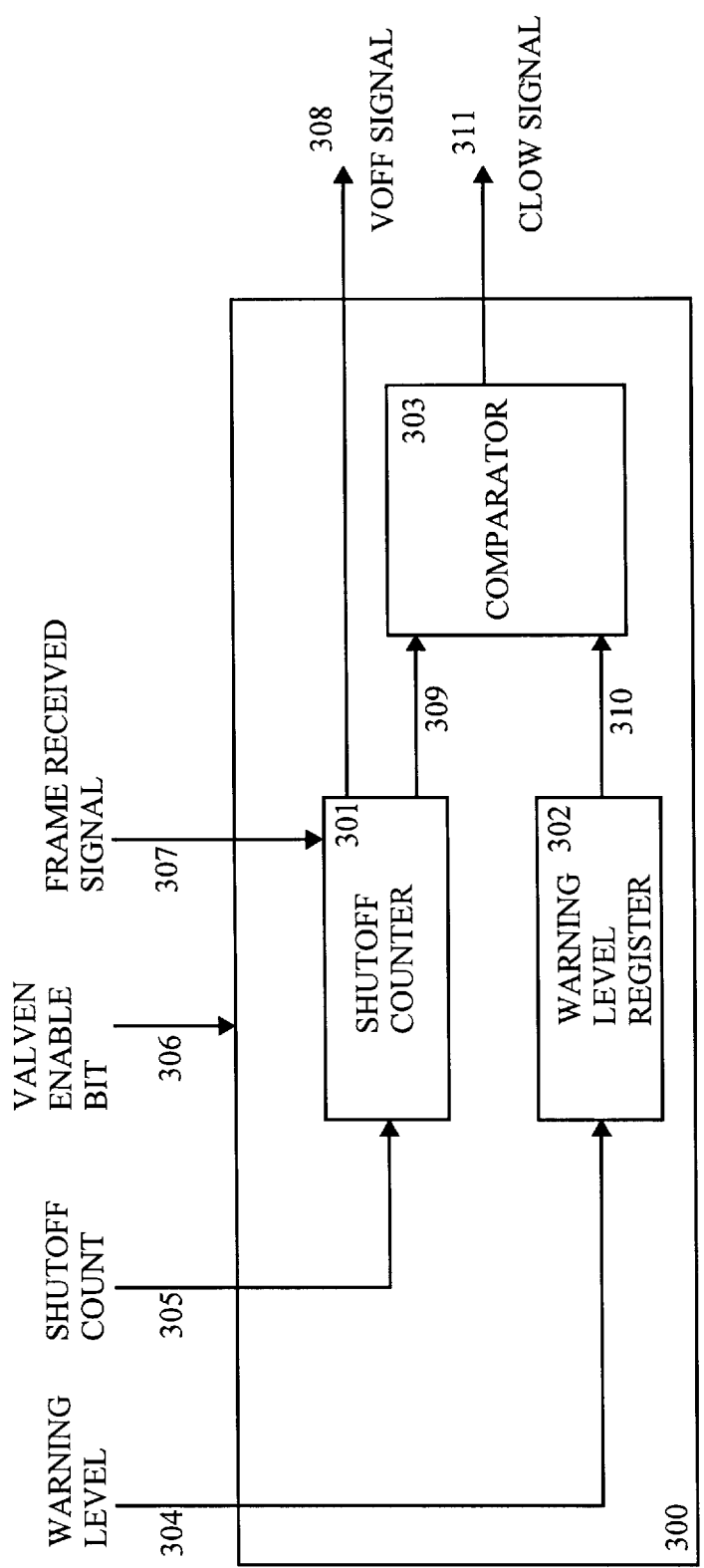
FIG. 3 is a block diagram of the preferred embodiment of the present invention, the shut-off valve.

The present invention provides a shut-off valve to prevent overflow due to a run-away channel. FIG. 3 illustrates a preferred embodiment of the shut-off valve 300 which is a part of serial I/O device 24. The preferred embodiment of the shut-off valve 300 is implemented with VALVEN enable bit 306, SHUTOFF counter 301, WARNING level register 302, a comparator 303, VOFF signal 308, and CLOW signal 311. VOFF and CLOW signals are provided as shut-off and warning signals respectively.

The host CPU 18 may enable or disable the receive channel shut-off valve using VALVEN enable bit 306 in specific channel registers in the set of registers 38. When VALVEN enable bit 306 for a specific channel is set, shut-off valve 300 is activated. Host CPU 18 programs a SHUTOFF value into SHUTOFF counter 305 for each channel that has an enabled shut-off valve. The host CPU 18 also programs a WARNING level into WARNING level register 302 which could be channel specific or globally shared among all channels. SHUTOFF counter 301 receives frame received signal 307 and uses it to monitor the number of data frames received by the associated channel. In the preferred embodiment, frame received signal 307 indicates to SHUTOFF counter 301 every time the channel receives a data frame. When this occurs, SHUTOFF counter 301 decreases the current SHUTOFF count by one. When the SHUTOFF count reaches zero indicating the number of frames received on the channel has reached the SHUTOFF value, that channel is deemed to be a runaway (i.e., receiving a burst of short frames) and SHUTOFF counter 301 outputs VOFF (valve off) signal 308 to turn off and halt data transfers on that receive channel. In another embodiment, VOFF signal 308 could cause generate an interrupt to the host CPU. The other channels remain open.

When the frame causing the SHUTOFF count to be reached is received, the channel reports new receive status as it would with any other received frame. Data transfer on the channel is halted until the host CPU 18 either loads a new value into the SHUTOFF counter, or the host CPU 18 disables the shut-off valve by clearing the VALVEN bit.

Before the SHUTOFF count is reached, the number of frames received on the channel may reach the value in WARNING level register 302 first. Comparator 303 compares current SHUTOFF count 309 received from SHUTOFF counter 301 with WARNING level 310 received from WARNING level register. When the current SHUTOFF count reaches WARNING level 310, comparator 303 sets warning status signal CLOW 311 to warn the host CPU that the channel is using up its buffer allotment and is close to being shut off. The channel also reports new receive status as it would with any other received frame. In a representative computer system, warning status signal CLOW 311 could cause the generation of an interrupt to notify the host CPU of this important event. The channel continues to receive data and the other channels are not affected. For each buffer receiving data frames while the SHUTOFF counter is less than the WARNING level, the associated CLOW status bit remains set. There is no need for the host CPU 18 to write a new value into the WARNING count. If the host CPU 18 wants to disable the WARNING level feature, the host CPU 18 may load the WARNING level register with a zero value.

In short, the WARNING level feature functions to protect a channel from erroneously being handled as a runaway channel. The WARNING level gives the host CPU an opportunity to replenish the supply of buffers for a high volume channel. Without the WARNING level feature, the host CPU would not be notified until the channel had already been disabled, risking the potential loss of valid data.

In normal operations, the WARNING level does not need to be monitored, replenished, or managed in any way thereby reducing the amount of host CPU handling required. Moreover, the host CPU can periodically reload the SHUTOFF counter value without examining it first or doing any mathematical operations to determine how quickly buffers are being used by the various channels. No timers or other CPU intensive operations such as calculating the receive data frame rate (packets/sec) are required. As a result, the present invention greatly reduces the host CPU overhead necessary.

Figure 4:
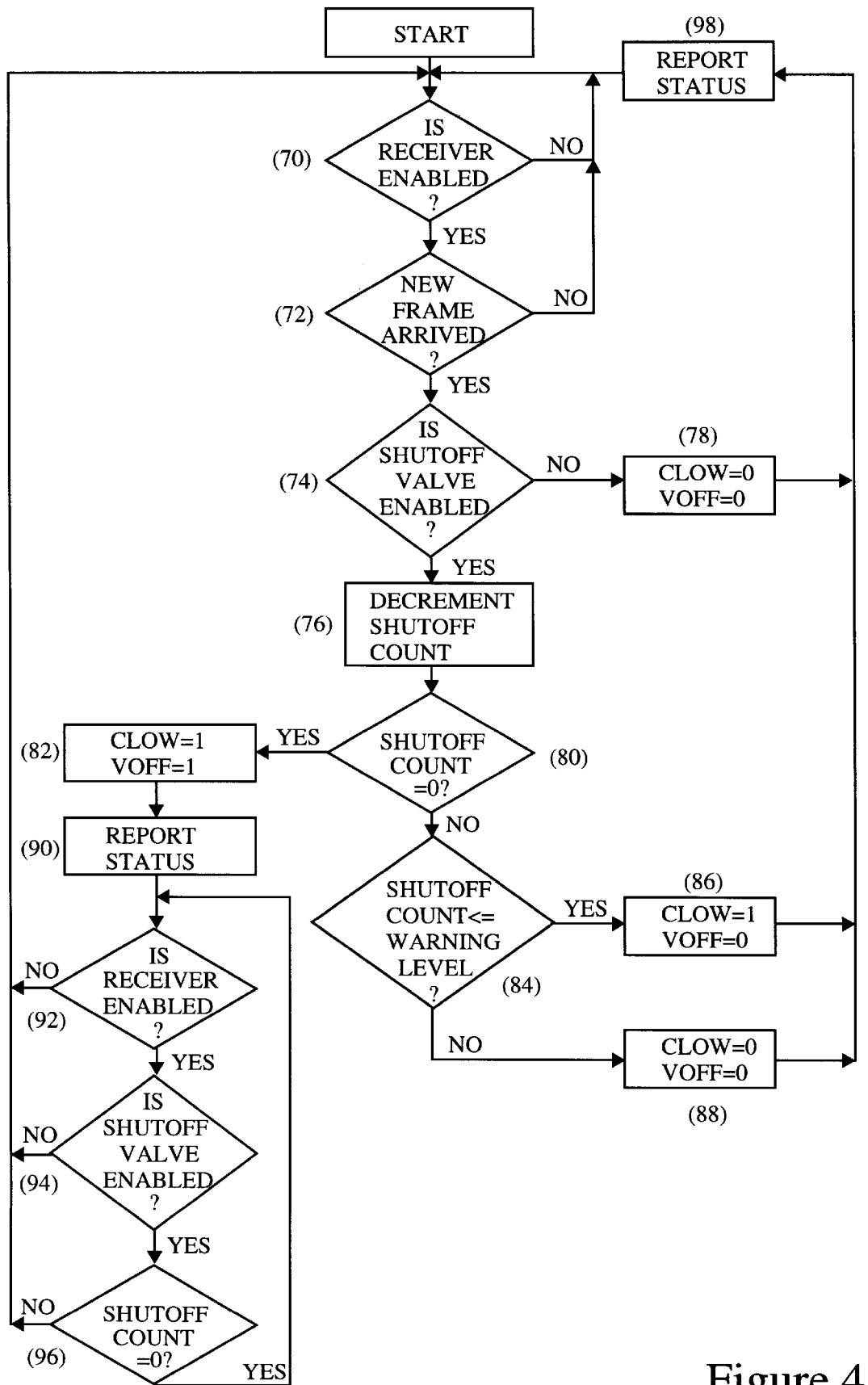
FIG. 4 is a flow diagram of an exemplary embodiment of a method of shutting off a receive channel in accordance with an exemplary embodiment of the present invention.

FIG. 4 is a flow chart of a method for determining when a channel should be shut off in accordance with an exemplary embodiment of the present invention. The values in the SHUTOFF counter and the WARNING level registers are assumed to be set prior to the start of the receipt of data frames in this example. In step 70, the embedded processor 32 determines whether the receive engine 42 for one of the receive channels (N) is enabled. If the receive engine 42 is disabled, the embedded processor 32 keeps monitoring the receive engine 42. On the other hand, if the receive engine 42 is enabled, the embedded processor 32 performs step 72 in which it determines whether a new data frame is received from the modem bank 14 through the receive engine 42 for the receive channel N. If a new data frame has not been received, the embedded processor 32 goes back and performs step 70 again. If a new data frame has been received, the embedded processor 32 then determines in step 74 whether the shutoff valve enable bit (VALVEN) is set for channel N.

If the VALVEN bit is not set for channel N, indicating that the shutoff feature is disabled for this channel, then the data frame is placed in one of the free buffers in memory 20, and CLOW and VOFF signals are set LOW in step 78. A LOW CLOW signal and a LOW VOFF signal indicate that the buffers in memory 20 for storing incoming data frames are not running low. Hence, the channel is not a runaway and will not be shut down immediately. A status report including information such as CLOW, VOFF, end of frame (EOF), and end of buffer (EOB) is then provided in step 98. The process continues with the embedded processor 32 performing step 70 again.

Conversely, if the VALVEN bit is set for channel N, shutoff counter 401, stored in the set of registers 38, is updated by decrementing by one (step 76) upon the receipt of the new frame. It is then determined in step 80 whether the shutoff counter has reached zero. The shutoff count is also compared against the warning level stored in register 402 in step 84. If the shut-off count is less than or equal to the warning level indicating although the buffer allotment has not run out, the channel is using up its allotment of buffer. As a result, CLOW and VOFF signals are set HIGH and LOW respectively in step 86. A HIGH CLOW signal is generated to allow the host adequate time to replenish new buffers. These CLOW and VOFF values along with other information are then used in generating a status report in step 98. The data frame is placed in one of the free buffers in memory 20. The process continues with the embedded processor 32 performing step 70 again.

Assuming the shut-off count is greater than the warning level indicating the buffer allotment is not running low, CLOW and VOFF signals are set LOW and LOW respectively in step 88 and the data frame is placed in one of the free buffers in memory 20. A status report including the CLOW and VOFF information is generated in step 98. The process continues with the serial I/O controller 32 performing step 70 again.

Assume now that the current shutoff count has reached zero, as determined in step 80. This means that channel N is deemed a runaway channel. A runaway channel may be a situation in which the channel may be receiving a continuous burst of short frame data that may overwhelm allotment buffers in the memory 20). The data frame received causing the shutoff counter to reach zero is processed like other data frames. However, a HIGH signal VOFF and HIGH signal CLOW are generated in step 88 to inform the host CPU 18 that the receive channel is off and to turns off the receive engine. A status report including the CLOW and VOFF information is generated in step 90. The receiver remains off until either the host CPU 18 disables the receive engine 42 (step 92), disables the shutoff valve 300 (step 94), or reloads the shut-off count (step 96).

The above description of a method for determining whether to shut off a receive channel is exemplary only, as other methods of shutting off a receive channel in response to specified receiving conditions are contemplated within the scope of the present invention. For example, the warning level register is not used in certain embodiments, and the receive channel is shut off if the shutoff counter reaches zero. In such an embodiment, the shutoff counter is periodically reloaded so that the receive channel is not shut off during normal receiving of data.

Although the present invention has been described and illustrated in detail, it is clearly understood that the same is by way of illustration and example only and is not to be taken by way of limitation, the spirit and scope of the present invention being limited only by the terms of the appended claims.

We claim:

1. A method of controlling a receive channel in a data communications system that receives data frames, comprising:

setting a shutoff counter with an initial count;

changing the count in the shutoff counter upon the receipt of each data frame to determine a current shutoff count;

shutting off the receive channel when the shutoff counter reaches a predetermined count;

setting a warning storage element with a warning value;

comparing said current shutoff count with the warning value; and generating an indication of an approaching shutoff when the shutoff count reaches the warning value.

2. The method of claim 1, wherein the shutting off step includes setting a shutoff valve bit indicating that a data frame has been received causing the shutoff counter to reach said predetermined count.

3. The method of claim 1, wherein the indication includes setting a count low bit indicating a data frame has been received causing the shutoff counter to reach said warning value.

4. The method of claim 1, further comprising setting a shutoff valve enable bit for each receive channel, wherein a set shutoff valve enable bit for a particular receive channel enables controlling that receive channel.

5. A shutoff valve device coupled to a host central processing unit (CPU) controlling data transfer and at least one receive channel for receiving data frames comprising:

a shutoff counter coupled to the host CPU that changes count upon receipt of a data frame by a serial I/O device over the receive channel, the host CPU initially sets the shutoff counter to an initial count, the shutoff counter changing its count with the receipt of each data frame over the receive channel, the shutoff counter generating a signal disabling the receive channel from receiving further data frames after the shutoff counter reaches a predetermined count;

a warning storage element coupled to the host CPU, the host CPU initially loading the warning storage element with a warning value; and a comparator coupled to the shutoff counter and the warning storage element, the comparator generating an indicating signal of an approaching shutoff when the shutoff counter reaches the warning value.

6. The shutoff valve device of claim 5, wherein the shutoff valve device is enable by setting a shutoff valve enable bit for the at least one receive channel.

7. The shutoff valve device of claim 5, further comprising a plurality of receive channels, each receive channel having a channel specific shutoff counter, warning storage element, and comparator.

8. The shutoff valve device of claim 5, wherein the shutoff signal setting a shutoff valve bit indicating that a data frame has been received causing the shutoff counter to reach said predetermined count.

9. The shutoff valve device of claim 5, wherein the indicating signal setting a count low bit indicating a data frame has been received causing the shutoff counter to reach said warning value.

10. A remote access device comprising:

a bus;

a host central processing unit (CPU) coupled to the bus;

a serial I/O device coupled to the bus, the serial I/O device comprising:

at least one receive channel for receiving data frames; and a shutoff valve comprising:

a shutoff counter coupled to the host CPU that changes count upon receipt of a data frame by the serial I/O device over the receive channel, the host CPU initially sets the shutoff counter to an initial count, the shutoff counter changing its count with the receipt of each data frame over the receive channel, the shutoff counter generating a signal shutting off the receive channel from receiving further data frames after the shutoff counter reaches a predetermined count;

a warning storage element coupled to the host CPU, the host CPU initially loading the warning storage element with a warning value; and a comparator coupled to the shutoff counter and the warning storage element, the comparator generating an indicating signal of an approaching shutoff when the shutoff counter reaches the warning value.

11. The remote access router of claim 10, wherein the shutoff valve device is enable by setting a shutoff valve enable bit for the at least one receive channel.

12. The remote access router of claim 10, further comprising a plurality of receive channels, each receive channel having a channel specific shutoff counter, warning storage element, and comparator.

13. The remote access router of claim 10, wherein the shutoff signal setting a shutoff valve bit indicating that a data frame has been received causing the shutoff counter to reach said predetermined count.

14. The remote access router of claim 10, wherein the indicating signal setting a count low bit indicating a data frame has been received causing the shutoff counter to reach said warning level.

\* \* \* \* \*